May 6, 1958 W. A. FLUMERFELT 2,833,031
METHOD OF MAKING CURVED CORRUGATED WEDGE MEMBERS
Filed Nov. 9, 1954 2 Sheets-Sheet 2
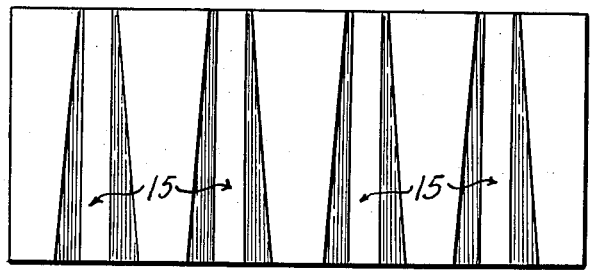
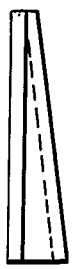
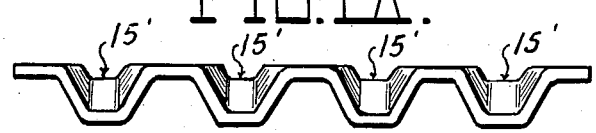
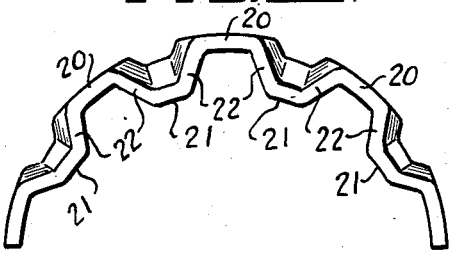
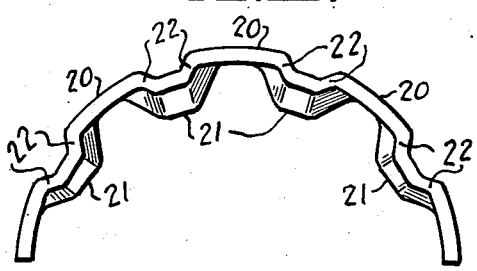
INVENTOR.
William A. Flumerfelt
BY
Edmund B Whitcomb
ATTORNEY

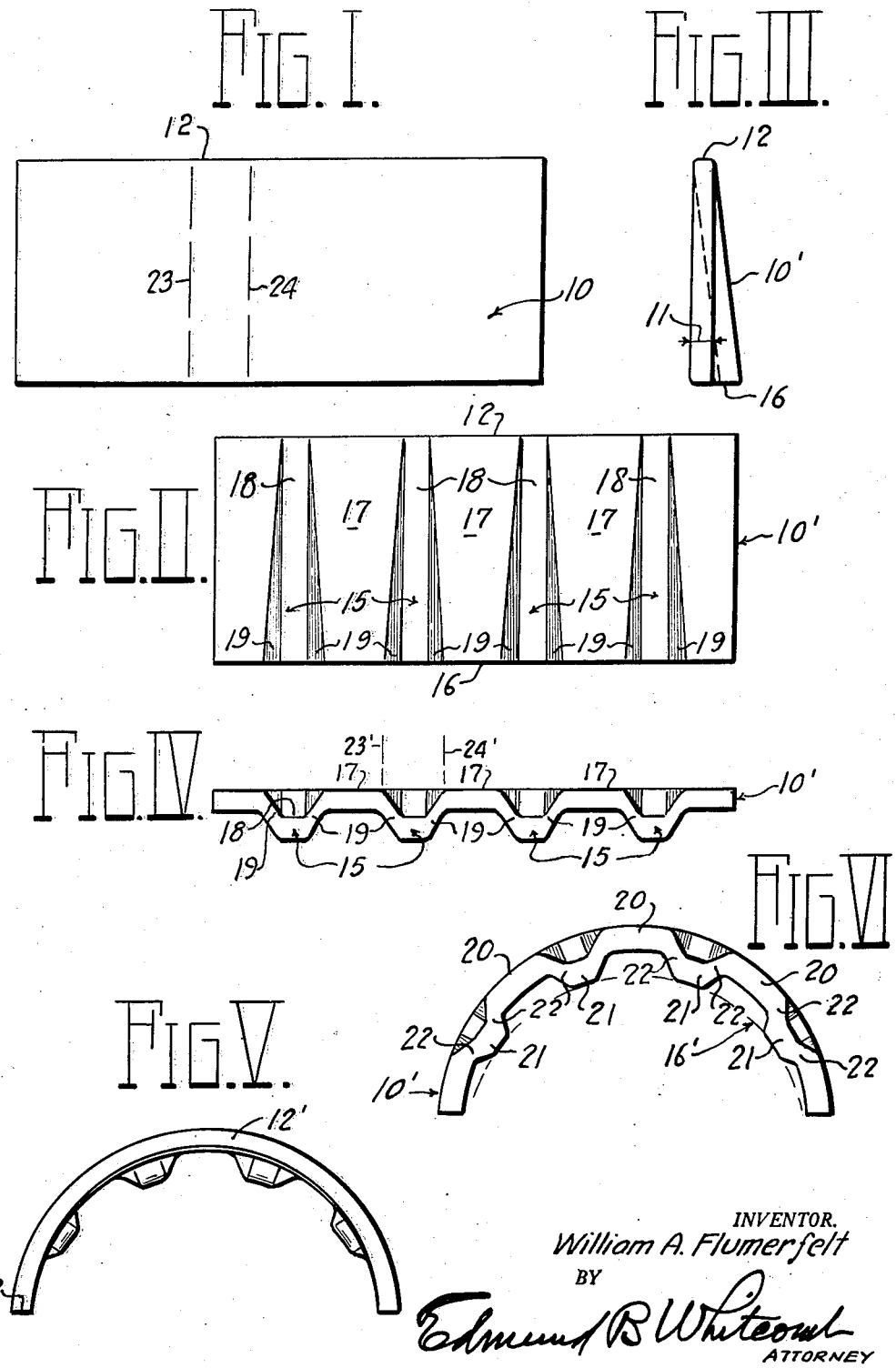

United States Patent Office 2,833,031
Patented May 6, 1958

2,833,031

METHOD OF MAKING CURVED CORRUGATED WEDGE MEMBERS

William A. Flumerfelt, Columbus, Ohio, assignor to The Columbus Auto Parts Company, Columbus, Ohio, a corporation of Ohio Application November 9, 1954, Serial No. 467,757

3 Claims. (Cl. 29—548)

The present invention relates to an efficient process or method of forming a transversely corrugated tapered curved wedge-shaped member particularly adaptable for use in a universal tie rod joint for an automobile or other vehicle steering mechanisms.

An object of the present invention is to provide a simplified economic method of producing such a wedge-shaped member as, for example, that forms the take-up means in a universal joint construction shown in the copending application, Serial No. 321,166, filed November 18, 1952, by Ross and Flumerfelt, now Patent No. 2,710,208.

My invention includes as an object thereof the method of producing a transversely corrugated tapered curved wedge-shaped member by providing a strip of metal cut at the beginning or later to length and of a predetermined width but which may be of various thicknesses and first transversely corrugating the same with the corrugations preferably uniformly varying in depth from one edge to the other edge of said strip and then curving and shaping the strip having said corrugations therein in one final operation into a semi-cylindrical shape with a thinner effective curved edge on one side and a thicker curved shaped edge on the other side.

More specifically, in one embodiment of my invention, I avoid waste of material and it consists in providing a rectangular plate, blank or sheet of suitable material—as metal—substantially the required thickness adaptable for the thin edge of the completed wedge and then transversely corrugating the same with a series of connected corrugations varying in depth from a maximum at one side or edge of the blank to a minimum at the opposite edge thereof, said corrugations formed, for example, by distortion or elongation of the metal itself from one edge to the other edge having the deepest corrugations, the rectangular sheet or blank will be provided, in effect, with a longer linear edge on the widened part of the wedge member when finally formed. This corrugated piece is thereupon curved into a semi-cylindrical shape by being coined or otherwise stamped in suitable dies to complete the wedge member and give the same a substantially semi-circular annular top rim or edge with a crescent-shaped thickened opposite edge where the deep corrugations are located in one embodiment hereof.

By my method, I produce a desired corrugated wedge member economically by a reduced number of operations and saving in material avoiding preshaping the blank and possible waste of metal.

The initial metal blank piece or strip need not be of the exact thickness of the metal forming the final wedge, since in the step of curving the corrugated flat blank into its semi-cylindrical shape, the stamping or coining operation forming this step can be made by properly shaped dies to give the desired final shape to the wedge even though the thickness of the original blank varies from the original thickness of the material of the initial blank or strip of material.

A further object of my invention is to provide a method of the type indicated in which both the inside and outside effective surfaces of the wedge shall each be of a substantially accurate cylindrical formation, but with one "effective" surface positioned at a small angle to the other, particularly when used in making the particular wedge for the joint of said copending application.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a top plan view of a suitable initial blank of metal;

Figure II is a plan view thereof after the transverse corrugations of varying depth have been pressed therein;

Figure III is an end view of the blank of Figure II;

Figure IV is a bottom edge view of the piece shown in Figure II;

Figure V is a top plan view of the final curved wedge member;

Figure VI is a bottom elevation of Figure V, showing the corrugated curved wedge from the edge having the deepest corrugations;

Figure VII is a top plan view of a corrugated strip of a modification in which a relatively thin stock of metal is used;

Figure VIII is an end view thereof;

Figure IX is a bottom edge view thereof;

Figure X is a top plan view of the finally curved wedge member; and

Figure XI is a bottom plan view thereof.

Referring to the first embodiment illustrated of my invention, I start with a rectangular blank 10 of a predetermined length and width as well as of a certain thickness 11, which thickness may preferably be of the required radial thickness of the thin edge 12 of the wedge member when finally completed, as shown in Figure V, although this thickness 11 of the original blank may vary, even in the embodiment of Figures I–VI. The width of the blank 10 corresponds to the height of the final wedge member. The length in Figures I–VI would be determined by the following formula:

$$L = \text{Pi}(R - 6/10\ T) - 2X$$

where $R$ = outer radius of the curved wedge, $T$ = the thickness of the material and $2X$ = the desired gap between the edges of opposing wedges if used in the joint of said copending application. As stated above, I may also start with a sheet or strip and provide sections such as blanks 10 for the operations. With suitable dies, I stamp the blank 10 into the configuration illustrated in Figures II and III, in which a plurality of equally spaced transverse corrugations 15 are formed therein tapering from one edge 12 to the other edge 16 of the blank as shown in Figure IV, the tapered effect being caused by varying the depth of the corrugations from a maximum at the edge 16 to zero at the opposite edge 12 as indicated in Figures III and IV. It is understood that the several tapered corrugations 15 could be variously spaced longitudinally of the blank 10 either to form equal or unequal depressions or elevations in the corrugated blank as shown in Figures II and III. Figure II being a top plan view, it will here be seen that by this first step of forming the corrugation just described, I provide at the stage a flat surface 17 between depressed flat surfaces 18 and connecting tapered side wall surfaces or webs 19 so that, as shown in Figures V and VI, these will form external ridge portions 20, internal ridge portions 21 and connecting webs 22.

In order to form these connecting web portions 22 by this first stamping or "corrugating" step in the flat piece as just described, it will be seen that the metal itself is stretched to give the necessary depth to the connecting web sections at the lower edge 16 in Figures III and IV. In this connection, it may be stated that the actual volume of the metal forming that portion of the blank illustrated in Figure I between the lines 23 and 24 will be of the same volume as that included in Figure IV between lines 23' and 24'. Moreover, it will be noted from a consideration of Figures II, III and IV, that at one edge 12 of the blank (referred to as the upper edge) there is no distortion of the metal to form the side walls or web portions 22, whereas, at the other edge termed the bottom edge 16, a maximum stretching or distortion of the metal is necessary to obtain the desired maximum depth required at this edge for the final wedge member.

After the blank has been transversely corrugated to the formation illustrated in Figures II, III and IV, it is still substantially in the same rectangular shape and size (as indicated in Figure II) and then certain of the corrugations are further modified into their final shape as will hereinafter appear.

The next step of my process is a stamping or coining operation in which the member 10' illustrated in Figures II, III and IV, is both curved to give the final required and desired curvature to the member and properly shape the corrugations of the wedge members. To this end, I desire to give, in effect, a certain cylindrical configuration to one side of the wedge member, namely, that one which will fit against the housing wall in an assembled joint if used for this purpose, as indicated above, while the other or inside effective surface curvature of the wedge member is also made to conform to a cylindrical surface but the cylinder is located at an angle as of about 7 degrees to the angle or upright position of the outer cylindrical configuration, thereby giving to the blank 10' of Figure IV a special final effective shape to the completed "wedge" member. This stamping or coining operation using said semi-cylindrical die surfaces with the axis of one at an angle of 7 degrees to the axis of the other, produces the crescent-shaped base shown in Figure VI, and the ridge portions 21 near the opposite sides of the crescent are modified to compress the metal into the web portions 22 so that the corrugations at the opposite sides of said crescent are of less depth than those at the center of the crescent. At this point, the wedge member may be hardened, if desired, by, for example, a cyanide process and then the curved member may be restruck in the coining dies.

If the thickness of the original blank 10 (Figure I) be chosen at the start of the exact thickness for the thin edge 12 of the thin edge of the wedge-shaped crescent member, as shown in Figures V and VI, the "thin" edge 12 of the final wedge will be substantially annular. However, if the original thickness of blank 10 be slightly greater than the final thickness of the thin edge, the result will be that the upper edge of the final member, as shown in Figure V, will also be nearly in the form of a half annulus 12, excepting for a very narrow central reduced portion indicated at 12', occuring in the coining step. As stated above, the lower edge, as shown in Figure VI, assumes in effect a crescent-shaped bottom edge indicated by including the dotted line 16'. Thus, by properly shaping the coining or stamping dies in the configurations of the cylinders just indicated and positioned at about 7 degree angle or the degree of "wedging" desired, one with respect to the other, this step, by my invention, has the effect of not only curving the otherwise flat blank 10' into the required final curved configuration illustrated in Figures V and VI, but this step also has a further modifying effect, as stated, on the connecting web portions 22 to thicken the same adjacent the opposite sides of the crescent so that while the thickness of the web portions 22 at the central portion of the crescent at the lower edge 16' are about the same as shown in the blank 10', at the opposite sides, this step also rethickens the web portions 22, compressing the metal to produce the shape, as shown in Figure VI.

Moreover, it will be seen that at and adjacent the upper curved edge 12, in the embodiment of Figures I–VI, the ridges 20 and 21 at the central portion thereof completely disappear and therefore do not here extend to the upper end of the wedges, although at both opposite side portions on the upper edge of the final wedge member, these portions 20, 21 and 22 very slightly exist.

In the modification shown in Figures VII to XI, the thickness of the metal started with, I have found may be about half the thickness ordinarily required for the thin edge of the wedge and by corrugating the metal from edge to edge, the strength of the final member is maintained to a required amount. In this modification, the same "effective" cylindrical configuration is maintained for the inside and outside surfaces of the wedge member as in the other embodiment of my invention and the wedge effect is produced by the 7 degree relationship of the dies for curving and finally shaping the piece, as in the other embodiment.

Thus, in Figures VIII and IX, I show the thickness of the original piece of metal used, as being relatively thin, about half as thick as that shown in Figures III and IV. In this modification of Figures VII to XI, the corrugations 15 extend completely across the plate and at the thin edge of the final wedge member, these corrugations appear as at 15', but the "effective" thickness of the thinner edge of the wedge at this point (see Figure X) is substantially the same as the solid thinner edge 12 of Figures III and V.

Figures VII to IX show the first step in this embodiment of forming these corrugations as stated. Then the corrugated plate of Figure IX is shaped by dies corresponding to those used in producing the wedge of Figures V and VI, and the corrugated plate of Figure IX is curved into the configuration shown in Figures X and XI, the dies having cylindrical acting surfaces positioned at the 7 degree angle mentioned above. The varying depth of the corrugations is effected by varying the depth of the web portions 22 in Figures X and XI. The outer ridge portions 20 and the inner ridge portions 21, forming the "effective" contacting surfaces of the completed wedge member as in the other embodiment for use in various instances where a wedge-shaped take-up member is employed. It will also be seen that the final shaping step also changes the shape and form of the corrugations producing the crescent-shaped corrugated edges shown in Figures X and XI.

It is apparent that within the scope of the invention, modifications and different arrangements may be made other than is herein disclosed, and the present disclosure is illustrative merely, the invention comprehending all variations thereof.

What I claim is:

1. A process of making a corrugated curved wedge take-up member which includes the steps of providing an elongated plain stock of sheet metal having opposite substantially parallel sides; stamping said metal to form a plurality of transverse corrugations therein, tapered from one longitudinal edge of said metal to the opposite edge by holding alternate spaced transverse sections of said metal from distortion while forcing other spaced transverse sections away from said first mentioned sections and simultaneously attenuating the metal connecting adjacent sections into triangular shaped web sections; producing a corrugated metal section having opposite lengths thereof substantially equal and forming a predetermined substantially rectangular unit of the required dimensions of the wedge member; and bending said corrugated rectangular unit into a curved wedge shaped member containing said tapered transverse corrugations.

2. A process of making a corrugated curved wedge take-up member which includes the steps of providing a stock of plain sheet metal; stamping said metal to form a plurality of transverse corrugations therein; tapered from one longitudinal edge of said metal to the opposite edge by holding alternate spaced transverse sections of said metal from distortion while forcing other spaced transverse sections away from said first mentioned sections and simultaneously attenuating the metal connecting adjacent sections into triangular shaped web sections; producing a pre-determined substantially rectangular corrugated unit of the required dimensions of the final wedge member, opposite parallel sides of said unit being of substantially the same length; and bending said corrugated rectangular unit into a curved wedge shaped member with the inner and outer spaced faces of said corrugations conforming to substantially cylindrical configurations wtih the axis of one set of faces positioned at an angle to the axis of the other set to form a final wedge shaped member having a crescent shaped base portion.

3. The method of claim 2 in which the steps of stamping and bending are performed without forming corrugations at one edge of said unit.

References Cited in the file of this patent

UNITED STATES PATENTS

| | | |
|---|---|---|
| 2,001,553 | Spencer | May 14, 1935 |
| 2,072,847 | Bolesky | Mar. 9, 1937 |
| 2,443,172 | Alldredge | June 22, 1948 |